Patented Apr. 23, 1940

2,198,211

UNITED STATES PATENT OFFICE 2,198,211

METHOD OF RENDERING FAT CONTAINING MEAT

Sidney Musher, New York, N. Y., assignor to Musher Foundation Incorporated, New York, N. Y., a corporation of New York No Drawing. Application March 10, 1939, Serial No. 260,898

8 Claims. (Cl. 260—412.6)

This process relates to a new method for the rendering of glyceride oils from meat and fishery products whereby markedly improved stability against oxidative deterioration of both the rendered product and the oil resulting from such rendering is obtained.

An object of this invention is the production of substantially stabilized glyceride oils from meat and fishery products.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the instant invention, fatty meats and fish, and particularly those capable of rendering whereby they have sufficient excess fat so that such excess fat may be removed, are substantially stabilized by adding thereto or dusting thereon relatively small quantities of finely divided granulated or powdered water soluble carbohydrates or aqueous solutions of carbohydrates such as glucose, molasses, etc., and desirably when such sugar is used in combination with a phosphorous containing compound such as lecithin, phosphoric acid, etc., and then subjected to an elevated temperature preferably above 215° F. and desirably above 250° F.

Among the water soluble carbohydrates that may be utilized are any of the mono-, di- and tri- saccharides including dextrose, sucrose, fructose, lactose, mannose, etc., and particularly sugars derived from the sugar cane, beet, corn and milk sugar manufacture. Most desirably, the crude sugars are employed such as raw cane, raw beet, blackstrap molasses, sorghum molasses, etc.

Example I

One-half of a fat back having a fat content of approximately 80% was sprinkled uniformly with 0.2% of refined cane sugar and the other half was untreated. Both were then heated to 245° F. for 130 minutes after which the fat was drained off, leaving the sugar residue and fat back residue behind. The fat thus obtained was tested for keeping quality by holding at 125° F. in open beakers and determining the rancid point by peroxide value.

|  | Peroxides after— | | |
|---|---|---|---|
|  | 2 days | 4 days | 6 days |
| Fat from untreated fat back | 14.5 | *29.8 | 62 |
| Fat from treated fat back | 3.9 | 7.5 | *16.7 |

* Rancid point.

By fat back is meant the loin of the hog which is used for rendering purposes in the manufacture of lard.

The sugar may be employed in any minor proportion such as from 0.05% to 5.0% against the weight of the fish or meat product being rendered. Desirably, less than 2% and preferably about 1% or less is employed.

Among the animal oils that may be obtained in stabilized condition in this manner are lard, tallow, oleo oil, mutton grease, and other forms of animal fats and oils that are used for food products, in the manufacturing of fats for baking, for soap making purposes, in the tin plate industry, etc. In addition, the fish oils such as herring, mackerel, menhaden, etc., oils and cod liver, halibut liver, etc., oils may similarly be obtained in stabilized condition.

Example II

One lot of sardine waste consisting of heads and tails and containing approximately 7% total oil against its wet weight had poured over its surface and mixed thoroughly with it 1.0% of blackstrap molasses against the solids weight of the waste. To another lot from the same catch nothing was added. The two lots were then heated to 275° F. until substantially free of water and substantially dry, in this case requiring about 13 hours. The residual solid material was then expressed using a screw propeller to produce the sardine oil. Both lots of sardine oil were tested as in Example I.

|  | Peroxide value after— | | | |
|---|---|---|---|---|
|  | 0 days | 1 day | 2 days | 3 days |
| Untreated sardine oil | 12.5 | *37 | 88 |  |
| Treated sardine oil | 4.0 | 6.8 | 12.4 | *41 |

* Rancid point.

Not only is rancidity retarded, but loss of Vitamin A is also retarded particularly when the process is applied to the manufacture of the high Vitamin A containing fish oils such as in the manufacture of sardine oil, salmon oil, mackerel oil that are used for poultry food, and also as in the manufacture of the fish liver oils such as cod liver oil, halibut liver oil, tunafish liver oil, etc. This process is similarly applicable to the manufacture of whale oil, menhaden oil and other fish oils.

For these purposes, the stabilizing material such as the sugar is added in the rendering kettle with the fat containing fish waste or whole fish, and desirably mixed therewith, and the mixture is heated to preferably in excess of 225° F. and during this rendering process the sugar presumably interacts with the fish containing the oil, so as to materially stabilize against oxidative deterioration the rendered oil and the residue left therefrom.

Not only is the rendered fat or oil substantially stabilized against deterioration, but the residues such as the substantially oil-free fish meal, etc., are also materially improved in keeping quality, so that such products may more satisfactorily be employed for stock and animal feeds, etc.

Example III

The sardine residues of Example II left after expression of the oil were held at room temperature in open containers, and observed regularly.

|  | Observations after— | | |
| --- | --- | --- | --- |
|  | 15 days | 30 days | 45 days |
| Residue from untreated sardine waste. | Off, fishy | Rancid | Very rancid. |
| Residue from treated sardine waste. | O. K. | Slightly fishy | Slightly rancid. |

It is observed that by treating the meat or fish product with the sugar material at the elevated temperature in the manner indicated, there is obtained a simultaneous improvement in the stability of both the rendered oil and fat and the residue obtained following the expression or extraction of the oil.

Example IV

One lot of menhaden fish containing approximately 9% total oil was steamed at 220° F. in their wet state for about 2 hours. At that time, the mass of oil, water and flesh were put through a press during which most of the oil and water was removed. The mixture of oil and water was centrifuged and the resultant menhaden oil bottled. The flesh residue following the press treatment was subjected to a direct flame heating at about 350° F. to dry, and the menhaden fish meal which was found to contain 9.5% oil was ground and sacked in burlap sacks.

To another lot of menhaden fish from the same catch 1% of blackstrap molasses was poured over the surface of the fish, and the fish steamed, and oil and meal produced as above.

The oils obtained from the treated and untreated lots of menhaden were tested as in Example I with the following results:

|  | Peroxides after— | |
| --- | --- | --- |
|  | 15 days | 30 days |
| Untreated menhaden oil | 171 | 1,642 |
| Treated menhaden oil | 35.8 | 194 |

The sacked menhaden meals were allowed to remain at room temperature and were observed at monthly intervals. At each examination over a period of six months the meal obtained from the molasses treated menhaden was found to be far superior in appearance and far less objectionable in odor than the untreated, the ratio of improvement at least doubles in the case of the treated meal over the untreated.

Not only does this treatment materially retard oxidative deterioration and rancidity as well as vitamin loss, but the meal or tankage, scrap, etc., will be much less subject to spontaneous combustion and its fire hazard much lessened by reason of reducing the onset and development of rancidity.

Even where the oil or fat is not removed as by the rendering process, following the addition of the sugar material, and subjecting the meat or fish to a heat treatment, the oil containing meat or fish product is very resistant to oxidative deterioration.

Example V

A catch of small herring containing approximately 7% oil in its wet state was divided into two lots. To one lot was added and thoroughly admixed therewith 0.3% by weight of blackstrap molasses. The other lot was left untreated. Both lots were then subjected to direct flame drying during which they were subjected to a temperature of about 325° F. until the full fat herring meal was substantially free of water. Samples from each lot were placed in closed flasks, half full, and held at room temperature in indirect light and observations were made at regular intervals.

|  | Observations after— | | |
| --- | --- | --- | --- |
|  | 15 days | 30 days | 45 days |
| Untreated herring meal. | Slightly fishy | Slightly rancid. | Definitely rancid. |
| Treated herring meal. | Good | Good | Fishy, not rancid. |

The fish or meat product may be heated either at super, normal or sub atmospheric pressure, but the temperature of heating should not be less than about 215° F.

It is necessary for the heating to be done after the addition of the sugar. Where the heating is done first and the sugar added subsequently, the desired stabilization is not obtained.

This is contrary to the normally expected result for generally heat treatment applied to lecithin, vegetable and animal oils and fats, etc., materially reduces the stability of such oil or fat. Under this process, however, heat is necessary after addition of the sugar material to give the desired results.

Although a heat treatment of 220° F. after addition of the sugar is sufficient to give improved stability to a rendered fat or oil and to the residues of the meat or fish product, the higher the heat up to about 450° F. the greater the stabilizing activity. It is furthermore desirable for the meat or fish product to be kept at the elevated temperature for a period of 30 minutes and preferably over 1 hour although shorter periods may also less desirably be employed.

Example VI

1% of refined cane sugar was added to the rendering kettle and a fatback was then placed in that kettle. A portion of the fatback was cut off and removed and a portion of the fat in the rendering kettle was dipped out after the fatback had been heated to 200° F. for 4 hours. Additional heat was applied to that portion which remained in the rendering kettle until a temperature of 275° F. was reached, and this temperature was maintained for 3 hours more.

The fats removed from the first and second lots were tested as in Example I.

|  | Peroxides after— | | |
|---|---|---|---|
|  | 1 day | 4 days | 8 days |
| Fat from fatback heated to 200° F | 2.5 | 12.8 | *38 |
| Fat from fatback heated to 275° F | 2.4 | 4.3 | **9.2 |

\* Rancid point.
\*\* Not rancid.

In addition to using the refined sugars such as refined cane sugar, refined beet sugar, refined corn sugar, etc., there may also be employed the substantially raw unrefined sugars such as raw cane sugar, raw beet sugar, and the residues and mother liquors from the crystallization of these sugars.

It is particularly desirable to employ sugars in combination with phosphorous containing materials such as with lecithin, milk phospholipins, phosphatides, phosphoric acid, etc. For example, there may satisfactorily be employed in accordance with this invention, a combination of sugar and lecithin, using for example, 10 parts of sugar to 1 or more parts of lecithin. The phosphorous containing material when used in conjunction with the sugar materially increases the stabilizing power of the sugar. In addition, there may be employed those products which are composed of both sugars and phosphorous containing materials or phospholipins such as powdered skim milk, powdered buttermilk, and water and alcoholic extracts of cereals and seeds, seed and spice residues, etc., which materials may be added to the rendering kettle in the rendering of meat or fish, and subjected to substantially elevated temperatures.

Example VII

A fatback was divided into two lots. One lot was uniformly sprinkled with 0.8% of powdered skim milk, and the fatback steamed under 40 lbs. pressure for 3 hours. The other fatback was steamed under 40 lbs. pressure for 3 hours without any addition, and immediately upon removal from the pressure cooker, there was admixed in this lot 0.8% (against its original weight) of powdered skim milk. The fat was removed in each case and tested as in Example I.

|  | Peroxides after— | | |
|---|---|---|---|
|  | 1 day | 2 days | 3 days |
| Fat from fatback treated after heating | *24.5 | 48.9 | 174 |
| Fat from fatback treated before heating | 8.5 | 16.2 | *27 |

\*Rancid point.

Example VIII

One half of a fatback was rubbed with 0.2% of a mixture comprising equal quantities of dextrose and lecithin. The other half was untreated. Both were then heated to 245° F. for 130 minutes after which the fat was drained off leaving the dextrose lecithin mixture behind. The fats were tested as in Example I.

|  | Peroxides after— | | | |
|---|---|---|---|---|
|  | 0 days | 4 days | 8 days | 12 days |
| Fat from untreated fatback | 6.5 | *35 | 121 |  |
| Fat from treated fatback | 2.8 | 6.4 | 17.4 | *41 |

\*Rancid point.

In all cases, even though the sugar or sugar material is drained off following the heat treatment, the stability of the fat and of the residue is retained just as if the sugar or sugar material were allowed to remain in contact with the fat or residue.

The sugars may be fortified with other products such as by mixing with those sugars a relatively small amount, generally less than 5%, and desirably under 1% of the aliphatic polycarboxylic acids such as tartaric, citric, lactic, etc.

Example IX

Fatbacks were rendered as in Example VII using 1% of a mixture composed of 3% of tartaric acid and 97% of refined cane sugar against the weight of the fatbacks for the treated half of a fatback. The treated and untreated fatbacks were tested as in Example I.

|  | Peroxides after— | | |
|---|---|---|---|
|  | 0 days | 4 days | 8 days |
| Fat from untreated fatback | 12.4 | *28.2 | 79 |
| Fat from treated fatback | 7.9 | 14.4 | *23.5 |

\* Rancid point.

By the expression "meat," there is included both meat and fish.

The present application is a continuation in part of copending application, Serial No. 135,169, filed April 5, 1937.

Having described my invention, what I claim is:

1. The process of rendering high fat containing meat which comprises thoroughly incorporating therewith a small amount of a sugar before the oil is removed, heating to a temperature above 215° F., and removing the oil, whereby a glyceride oil is produced which will be in highly stabilized condition.

2. The process of rendering high fat containing meat which comprises thoroughly incorporating therewith a small amount of a crude sugar before the oil is removed, heating to a temperature above 215° F., and removing the oil, whereby a glyceride oil is produced which will be in highly stabilized condition.

3. The process of rendering high fat containing meat which comprises thoroughly incorporating therewith a small amount of a combination of a sugar and a phosphatide before the oil is removed, heating to a temperature above 215° F., and removing the oil, whereby a glyceride oil is produced which will be in highly stabilized condition.

4. The process of rendering high fat containing meat which comprises thoroughly incorporating therewith a small amount of a combination of a sugar and lecithin before the oil is removed, heating to a temperature above 215° F., and removing the oil, whereby a glyceride oil is produced which will be in highly stabilized condition.

5. The process of rendering fat backs to produce a stabilized lard which comprises thoroughly incorporating a small amount of a combination of a sugar and a phosphatide with the fat backs before the lard is removed therefrom, heating to a temperature above 215° F., and removing the lard, whereby a lard is produced which will be in highly stabilized condition.

6. The process of rendering fat backs to produce a stabilized lard which comprises thoroughly incorporating 0.2% of a mixture of equal quantities of dextrose and lecithin with the fat backs before the lard is removed therefrom, heating to a temperature above 215° F., and removing the lard, whereby a lard is produced which will be in highly stabilized condition.

7. The process of rendering high fat containing meat which comprises thoroughly incorporating therewith a small amount of molasses before the oil is removed, heating to a temperature above 215° F., and removing the oil, whereby a glyceride oil is produced which will be in highly stabilized condition.

8. The process of rendering high fat containing meat which comprises thoroughly incorporating therewith a small amount of blackstrap molasses before the oil is removed, heating to a temperature above 215° F., and removing the oil, whereby a glyceride oil is produced which will be in highly stabilized condition.

SIDNEY MUSHER.